US012723716B2

(12) United States Patent
Takayama

(10) Patent No.: US 12,723,716 B2
(45) Date of Patent: Sep. 1, 2026

(54) HYDROGEN GAS SUPPLY METHOD AND HYDROGEN GAS SUPPLY SYSTEM

(71) Applicant: MITSUI E&S Co., Ltd., Tokyo (JP)

(72) Inventor: Yusuke Takayama, Okayama (JP)

(73) Assignee: MITSUI E&S CO., LTD., Tokyo (JP)

( * ) Notice: Subject to any disclaimer, the term of this patent is extended or adjusted under 35 U.S.C. 154(b) by 24 days.

(21) Appl. No.: 19/077,498

(22) Filed: Mar. 12, 2025

(65) Prior Publication Data

US 2025/0320965 A1 Oct. 16, 2025

(30) Foreign Application Priority Data

Apr. 15, 2024 (JP) ................................ 2024-065632
Oct. 16, 2024 (JP) ................................ 2024-181253

(51) Int. Cl.
*F17C 5/06* (2006.01)

(52) U.S. Cl.
CPC .......... *F17C 5/06* (2013.01); *F17C 2221/012* (2013.01); *F17C 2225/0123* (2013.01); *F17C 2225/036* (2013.01); *F17C 2227/0164* (2013.01); *F17C 2227/0185* (2013.01); *F17C 2270/0168* (2013.01)

(58) Field of Classification Search
CPC .................. F17C 5/06; F17C 2221/012; F17C 2265/063; F04B 23/04; F04B 2015/0822
See application file for complete search history.

(56) References Cited

U.S. PATENT DOCUMENTS

2014/0034162 A1* 2/2014 Mackey .................. F04B 23/04 137/565.29
2016/0123351 A1* 5/2016 Nagao .................... F25J 3/0266 415/177

FOREIGN PATENT DOCUMENTS

JP 2016183684 10/2016
JP 2021139378 9/2021
JP 2023067967 5/2023

* cited by examiner

*Primary Examiner* — Jason K Niesz
(74) *Attorney, Agent, or Firm* — Hodgson Russ LLP

(57) ABSTRACT

A hydrogen gas supply method and the hydrogen gas supply system is provided, including a low-pressure compressor 1 and a high-pressure compressor 2 that compress hydrogen gas, in which a necessary pressure at a supply destination includes a low-pressure region and a high-pressure region and the hydrogen gas is supplied to the supply destination in accordance with the necessary pressure. The low-pressure compressor 1 is a piston crank type compressor. The high-pressure compressor 2 is a hydraulic compressor or a diaphragm type compressor. When the necessary pressure at the supply destination is in the low-pressure region, the hydrogen gas compressed by the low-pressure compressor 1 is supplied to the supply destination.

14 Claims, 8 Drawing Sheets

HYDROGEN GAS SUPPLY METHOD AND HYDROGEN GAS SUPPLY SYSTEM

CROSS REFERENCE TO RELATED APPLICATION(S)

This application claims priority to Japanese Patent Application No. 2024-065632, filed Apr. 15, 2024, and to Japanese Patent Application No. 2024-181253, filed Oct. 16, 2024, the entire disclosures of which are incorporated herein by reference.

TECHNICAL FIELD

The present invention relates to a hydrogen gas supply method and a hydrogen gas supply system, and specifically to a hydrogen gas supply method and a hydrogen gas supply system that can stably compress hydrogen either at low pressure or high pressure and satisfy clients' requests for quick hydrogen filling.

BACKGROUND

In recent years, the development of fuel cell vehicles (FCV) powered by hydrogen gas has been advanced and is about to reach the stage of commercialization. Hydrogen gas is supplied to hydrogen tanks of fuel cell vehicles at hydrogen stations where the tank is filled with hydrogen, just as gasoline is supplied to gasoline-powered vehicles at gas stations.

While there are on-site hydrogen stations that are equipped with a hydrogen production apparatus and supply hydrogen produced by that apparatus, there are off-site hydrogen stations that use pallets incorporating multiple gas containers (red) of hydrogen produced outside as the hydrogen supply source in terms of decreasing the facility costs.

Patent document JP-A-2021-139378 discloses a method in which, in a case of producing hydrogen gas with high pressure, the pressure is increased over 82 MPa, for example, using a hydraulic booster type compressor and the gas is accumulated in a pressure accumulator and in a case of producing hydrogen gas with medium pressure, the pressure is increased to 40 MPa, for example, using a hydraulic booster type compressor and the gas is accumulated in a pressure accumulator.

However, the hydraulic compressor has a mechanism in which a piston is driven by a hydraulic force of hydraulic oil, and the maximum number of cycles is smaller than that of a piston crank type compressor with a crank mechanism due to limitations of sealing of the hydraulic oil and the like. Therefore, there is a drawback that the flow rate per compressor is lower when the pressure is increased from the low pressure to the high pressure, as compared to the piston crank type.

Patent document JP-A-2016-183684 discloses a method of five-stage compression using a crank type compressor. Specifically, the compressor has cylinders extending radially around a crank type rotational driving unit, each cylinder having a piston internally, and the pressure is increased from 0.6 MPa to 145.8 MPa through the five-stage compression.

The piston crank type can compress a large flow rate in the compression from the low pressure because the number of cycles is large. At hydrogen stations, ultrahigh-pressure compression of 80 MPa or higher is performed.

In Patent document JP-A-2023-67967, a crank type compressor is used at a high pressure of 50 MPa or more, and in this type of hydrogen station, the crank type compressor may also be used at a high pressure of 50 MPa or more. However, according to the present inventor's examination, there is concern that ultrahigh pressure compression will result in a decrease in service life of wear parts and a decrease in reliability compared to the low-pressure compression.

SUMMARY OF THE INVENTION

Problem To Be Solved By The Invention

In view of the above, it is an object of the present invention to provide a hydrogen gas supply method and a hydrogen gas supply system that can stably compress hydrogen either at low pressure or high pressure and have excellent reliability.

Furthermore, other objects of the present invention will become apparent by the following description.

Means For Solving Problem

The above problems are solved by each of the following aspects of the present invention.

1.

A hydrogen gas supply method using a low-pressure compressor and a high-pressure compressor that compress hydrogen gas, in which a necessary pressure at a supply destination includes a low-pressure region and a high-pressure region and the hydrogen gas is supplied to the supply destination in accordance with the necessary pressure, wherein

- the low-pressure compressor is a piston crank type compressor,
- the high-pressure compressor is a hydraulic compressor or a diaphragm type compressor,
- when the necessary pressure at the supply destination is in the low-pressure region, the hydrogen gas compressed by the low-pressure compressor is supplied to the supply destination, and
- when the necessary pressure at the supply destination is in the high-pressure region, the hydrogen gas is compressed by the low-pressure compressor, the compressed hydrogen gas is introduced into the high-pressure compressor, and the hydrogen gas compressed by the high-pressure compressor is supplied to the supply destination.

2.

The hydrogen gas supply method according to 1, wherein

- the supply destination of the hydrogen gas is a pressure accumulator or a hydrogen storage tank of a mobile body, in a hydrogen station, and
- a filling method for the hydrogen storage tank is a direct filling method from the low-pressure compressor and the high-pressure compressor, a differential pressure filling method from the pressure accumulator, or a combination of the direct filling method and the differential pressure filling method.

3.

The hydrogen gas supply method according to 1, wherein the low-pressure region of the necessary pressure at the supply destination is a region in which an upper limit value is an optional value of 40 to 50 MPa, and the high-pressure region is a region higher than the optional value as the upper limit value in the low-pressure region and is 100 MPa or less.

4.

The hydrogen gas supply method according to 1, wherein an electric motor is used in common between the piston crank type compressor, and the hydraulic compressor or the diaphragm type compressor.

5.

The hydrogen gas supply method according to 4, wherein a clutch is provided to control ON and OFF of driving of the hydraulic compressor or the diaphragm type compressor.

6.

The hydrogen gas supply method according to 1, wherein the piston crank type compressor, and the hydraulic compressor or the diaphragm type compressor are mounted integrally and share common auxiliary devices to be configured as a unit having a size within a same skid.

7.

A hydrogen gas supply system comprising a low-pressure compressor and a high-pressure compressor that compress hydrogen gas, wherein a necessary pressure at a supply destination includes a low-pressure region and a high-pressure region and the hydrogen gas is supplied to the supply destination in accordance with the necessary pressure, the low-pressure compressor is a piston crank type compressor, the high-pressure compressor is a hydraulic compressor or a diaphragm type compressor, when the necessary pressure at the supply destination is in the low-pressure region, the hydrogen gas compressed by the low-pressure compressor is supplied to the supply destination, and when the necessary pressure at the supply destination is in the high-pressure region, the hydrogen gas is compressed by the low-pressure compressor, the compressed hydrogen gas is introduced into the high-pressure compressor, and the hydrogen gas compressed by the high-pressure compressor is supplied to the supply destination.

8.

The hydrogen gas supply system according to 7, wherein the supply destination of the hydrogen gas is a pressure accumulator or a hydrogen storage tank of a mobile body, in a hydrogen station, and a filling method for the hydrogen storage tank is a direct filling method from the low-pressure compressor and the high-pressure compressor, a differential pressure filling method through the pressure accumulator, or a combination of the direct filling method and the differential pressure filling method.

9.

The hydrogen gas supply system according to 7, wherein the low-pressure region of the necessary pressure at the supply destination is a region in which an upper limit value is an optional value of 40 to 50 MPa, and the high-pressure region is a region higher than the optional value as the upper limit value in the low-pressure region and is 100 MPa or less.

10.

The hydrogen gas supply system according to 7, wherein an electric motor is used in common between the piston crank type compressor, and the hydraulic compressor or the diaphragm type compressor.

11.

The hydrogen gas supply system according to 10, wherein a clutch is provided to control ON and OFF of driving of the hydraulic compressor or the diaphragm type compressor.

12.

The hydrogen gas supply system according to 7, wherein the piston crank type compressor, and the hydraulic compressor or the diaphragm type compressor are mounted integrally and share common auxiliary devices to be configured as a compressor unit having a size within a same skid.

13.

The hydrogen gas supply system according to 7, comprising:

an electric motor pulley (102) provided at a driving shaft (101) of an electric motor (100);

a piston crank type compressor pulley (103) provided at a piston crank type compressor side driving shaft (107) of the piston crank type compressor (1); and a hydraulic compressor pulley (105) provided at a hydraulic compressor side driving shaft (108) of the hydraulic compressor (2), wherein the electric motor pulley (102) and the piston crank type compressor pulley (103) are rotatably connected to each other through a piston crank type compressor belt (104), the electric motor pulley (102) and the hydraulic compressor pulley (105) are rotatably connected to each other through a hydraulic compressor belt (106), the piston crank type compressor (1) has a structure in which the driving shaft is rotated by driving of the electric motor and the rotation is converted into linear reciprocation of a piston through a crankshaft, thereby compressing the hydrogen gas that fills a space above the piston in a cylinder, and the hydraulic compressor (2) has a structure in which the driving shaft is rotated by the driving of the electric motor and a hydraulic pump is driven to generate a hydraulic pressure, the hydraulic pressure is converted into the reciprocation of the piston, and the reciprocation of the piston compresses the hydrogen gas that fills the cylinder.

14.

The hydrogen gas supply system according to 7, wherein a piping system (110) that leads to a suction side of the hydraulic compressor (2), which performs high-pressure hydrogen compression, through low-pressure compression of the piston crank type compressor (1), and leads to the hydraulic compressor (2), and a branch piping system (111) that bypasses the hydraulic compressor (2) without entering the suction side of the hydraulic compressor (2) through the piston crank type compressor (1), and leads to a discharge side of the hydraulic compressor (2) are provided, a control valve (112) that controls opening and closing is provided at the branch piping system (111), a clutch (109) that enables disconnection of a driving force of the electric motor (105) of the hydraulic compressor (2) is provided at the driving shaft (108) of the hydraulic compressor (2), when the necessary pressure at the supply destination is a set value or less, the clutch (109) is disengaged to open the control valve (112), and when the necessary pressure at the supply destination is higher than the set value, the clutch (109) is engaged to close the control valve (112).

Effect of the Invention

The present invention can provide the hydrogen gas supply method and the hydrogen gas supply system that can stably compress hydrogen either at low pressure or high pressure and have excellent reliability.

The present invention also provides the hydrogen gas supply method and the hydrogen gas supply system that are capable of stable filling with a large volume of hydrogen, in a hydrogen station and excellent in customer satisfaction.

DESCRIPTION OF THE PREFERRED EMBODIMENTS

A preferred embodiment of the present invention will hereinafter be described.

Figure 1:
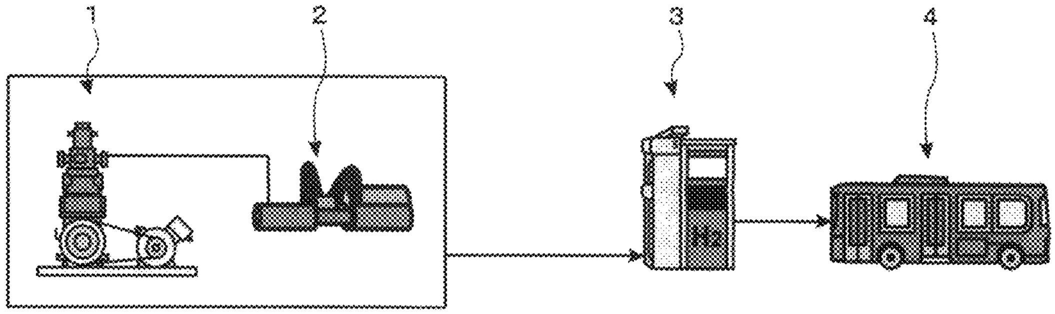
FIG. 1 is a schematic side view illustrating an example of a hydrogen station to which the present invention is suitably applied, which illustrates a direct filling method.
Figure 2:
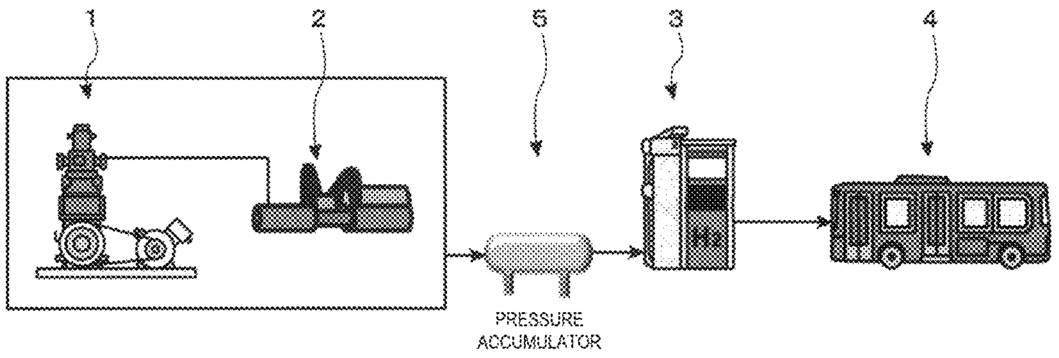
FIG. 2 is a schematic side view illustrating another example of the hydrogen station to which the present invention is suitably applied, which illustrates a differential pressure filling method.

FIG. 1 and FIG. 2 are schematic side views each illustrating an example of a hydrogen station to which the invention is suitably applied. The example in FIG. 1 illustrates a direct filling method and the example in FIG. 2 illustrates a differential pressure filling method.

The description is made based on FIG. 1 and FIG. 2. The compressor includes a piston crank type compressor 1, which is a low-pressure hydrogen compressor, and a hydraulic compressor 2, which is a high-pressure hydrogen compressor.

FIG. 1 illustrates the example of the direct filling method in which a hydrogen storage tank of a mobile body 4 is filled with hydrogen gas produced by compression in the low-pressure hydrogen compressor 1 and the high-pressure hydrogen compressor 2 through a dispenser 3.

FIG. 2 illustrates an example of a differential pressure filling method in which the hydrogen gas produced by the compression in the compressor is supplied once to a pressure accumulator 5 and then, the hydrogen storage tank of the mobile body 4 is filled with the hydrogen gas from the pressure accumulator 5 through the dispenser 3.

As illustrated in FIG. 1 and FIG. 2, the hydrogen gas supplied from the compressor is supplied to the pressure accumulator 5 or the hydrogen storage tank of the mobile body 4, in the hydrogen station.

The hydrogen storage tank of the mobile body 4 can be filled with the hydrogen gas by the direct filling method in which the hydrogen gas is supplied from the compressor through the dispenser 3 as illustrated in FIG. 1 or the differential pressure filling method in which the hydrogen gas is supplied from the compressor to the pressure accumulator 5 and then supplied from the pressure accumulator 5 through the dispenser 3 as illustrated in FIG. 2, or by using the direct filling method and the differential pressure filling method in combination.

In the example illustrated in this embodiment, the hydrogen gas to serve as fuel is supplied from the compressor to the pressure accumulator 5 or the hydrogen storage tank of the mobile body 4, which is the supply destination, in the hydrogen station. However, the present invention is not limited to this example and the supply destination of the hydrogen gas is not limited to the hydrogen station. The hydrogen gas can be compressed and supplied to a storage tank for hydrogen transportation.

In an example described below, the supply destination of the hydrogen gas as the fuel is the hydrogen storage tank in the hydrogen gas supply method and system according to the present invention.

In the hydrogen gas supply method and supply system according to the present invention, low-pressure compressed hydrogen produced by driving the crank type compressor is supplied to the hydrogen storage tank while the required or necessary pressure of the hydrogen gas pressure in the hydrogen storage tank at the supply destination is a low-pressure region (for example, about 0 to 50 MPa). As the hydrogen gas is supplied into the tank and the hydrogen volume in the tank increases, the pressure in the tank increases. Accordingly, the required pressure in the hydrogen storage tank also increases.

In other words, the necessary pressure of the tank varies depending on the pressure in the tank, which varies according to the volume of hydrogen gas in the tank, and as the hydrogen gas is supplied more to the tank, the necessary pressure of the tank increases.

In the present invention, the necessary pressure at the supply destination is sectioned into two regions: a low-pressure region and a high-pressure region. In the case of the low-pressure region, the hydrogen gas can be sufficiently supplied to the supply destination with the pressure of the hydrogen gas compressed by the low-pressure compressor. Therefore, it is not necessary to start the high-pressure compressor.

In this specification, when the necessary pressure at the supply destination is in the low-pressure region, supplying the hydrogen gas compressed by the low-pressure compressor to the supply destination means that the hydrogen gas with the pressure compressed by the low-pressure compressor is sufficient for the supply to the supply destination; therefore, the compression process by the high-pressure compressor is unnecessary.

The fact that the compression process by the high-pressure compressor is unnecessary includes the introduction of the hydrogen gas into the high-pressure compressor and the distribution of the hydrogen gas through the high-pressure compressor without substantially increasing the pressure. The hydrogen gas introduced into the high-pressure compressor can be used as a channel flowing in the high-pressure compressor without the compression process. The fact that the compression process by the high-pressure compressor is unnecessary includes switching of the channel without introducing the hydrogen gas into the high-pressure compressor using a control valve, which is described below.

In a case where the necessary pressure at the supply destination is the low-pressure region and does not reach the high-pressure region in this embodiment, the hydrogen supplied from the compressor can be supplied as long as the pressure of the hydrogen is higher than the necessary pressure at the supply destination even a little. Therefore, the hydrogen gas can be supplied to the supply destination without the necessity of compressing the hydrogen gas by the high-pressure compressor. Therefore, in this case, only the low-pressure compressor is operated and the high-pressure compressor is not operated (a clutch, which will be described below, is disengaged to keep the driving force non-transmitted). This has the effect of largely reducing the power cost because the high-pressure compressor is no longer in operation. In addition, when a sliding part of the high-pressure compressor, such as a piston, can be stopped by the stop of the operation of the high-pressure compressor, this will have the effect of reducing wear.

On the other hand, in the case of the high-pressure region, the pressure of the hydrogen gas compressed by the low-pressure compressor is insufficient for the supply to the supply destination; therefore, the supply destination is not filled with the hydrogen gas. In view of this, the hydrogen gas compressed by the low-pressure compressor is introduced into the high-pressure compressor so as to compress the hydrogen gas in the high-pressure compressor. Thus, even in the case of the high-pressure region, the pressure to enable the supply of the hydrogen gas to the supply destination can be achieved.

If the hydrogen gas pressure in the hydrogen storage tank, which is the supply destination, is the high-pressure region (for example, about 50 to 100 MPa), the hydrogen gas is compressed to a pressure of 50 MPa by operating the low-pressure compressor, and then the high-pressure compressor is operated either by running the electric motor of the high-pressure compressor or by engaging the clutch. Thus, the hydrogen gas that has reached a pressure of 50 MPa in the low-pressure compressor is compressed further to the high pressure and then supplied to the hydrogen storage tank at the supply destination.

In the present invention, depending on the necessary pressure of the hydrogen storage tank, if the necessary pressure is in the low-pressure region, the piston crank type compressor is driven to compress and the hydrogen storage tank, which is the supply destination, is filled with the hydrogen gas without driving the hydraulic compressor or the diaphragm type compressor.

Next, if the required pressure has reached the high-pressure region over the low-pressure region, the electric motor of the high-pressure compressor is operated (the driving force is transmitted to the high-pressure compressor by engaging the clutch), the hydrogen gas is compressed by the low-pressure compressor, the hydrogen gas compressed by the low-pressure compressor is introduced into the high-pressure compressor, and the pressure of the hydrogen gas is compressed in the high-pressure compressor so as to exceed the required pressure at the supply destination before the filling.

The piston crank type compressor 1 used as the low-pressure compressor may have a plurality of compression stages; for example, three or four stages are preferred.

The hydraulic compressor 2 used as the high-pressure compressor may have either a single stage or two stages.

The total number of compressor stages, including the low-pressure and high-pressure compressors, may be five or about six to eight.

In the present invention, the upper limit value of the low-pressure region of the hydrogen gas pressure in the hydrogen storage tank is preferably in the range of 40 to 50 MPa or less. This upper limit value varies according to the design value of the compression capability of the low-pressure compressor. The upper limit value of the low-pressure region in the present invention is substantially equal to the upper limit of the pressure of the hydrogen gas that can be pressurized by the low-pressure compressor.

On the other hand, the high-pressure region of the hydrogen gas pressure in the hydrogen storage tank is preferably higher than the upper limit value of the low-pressure region and is 100 MPa or less.

In this embodiment, the upper limit value of the low-pressure region is an optional value in the range of 40 to 50 MPa or less, and the high-pressure region is a region with a lower limit value being a value higher than the optional value as the upper limit of the low-pressure region and with an upper limit being 100 MPa at maximum.

The gas pressure for the low-pressure compression in the low-pressure hydrogen compressor 1 ranges from 0.6 to 50 MPa, while the gas pressure for the high-pressure compression in the high-pressure hydrogen compressor 2 is in the range with an upper limit of 100 MPa. Since the low-pressure hydrogen compressor 1 increases the gas pressure in multiple stages as described above, the pressure can be increased to any desired gas pressure by designing the pressure increase ratio according to the number of stages. In this embodiment, the high-pressure hydrogen compressor 2 is a compressor for further increasing the pressure to supply the hydrogen gas when the pressure to be supplied is insufficient in the low-pressure hydrogen compressor 1, for example, when the necessary pressure (required pressure) at the supply destination is the high-pressure region. Therefore, the lower limit of the gas pressure for the high-pressure compression in the high-pressure hydrogen compressor 2 varies according to the upper limit of the low-pressure hydrogen compressor 1.

The flow rate of the hydrogen gas that can be supplied to the hydrogen storage tank is 400 to 1200 $Nm^3/Hr$ under standard conditions throughout the compressors. If three to eight mobile bodies such as automobiles enter the hydrogen station at the same time and wish to be filled up with hydrogen, the system according to the present invention is ready to fill smoothly without congestion due to its large hydrogen gas flow rate for the filling, which is extremely practical.

The hydrogen to be compressed is usually brought to the hydrogen station in hydrogen cardle (incorporating gas containers (red) of externally produced hydrogen). Hydrogen may alternatively be supplied to the hydrogen station by pipelines instead of the hydrogen cardle.

Hydrogen is produced externally and brought to the hydrogen station in a gaseous form, but hydrogen may alternatively be liquefied hydrogen.

The hydrogen station can be equipped with a hydrogen production apparatus and use hydrogen produced by the apparatus. Examples of the hydrogen production apparatus include an apparatus to manufacture the hydrogen gas by having a water electrolyzer installed and using an external power source, a hydrocarbon fuel decomposing apparatus, and an apparatus in which a liquefied hydrogen storage container filled with liquefied hydrogen is installed and the hydrogen gas is produced by a vaporizer.

In the hydrogen gas supply method and system according to the present invention, the mobile body 4 may be a fuel cell vehicle, a ship, or the like that uses hydrogen as the fuel.

Since a large flow rate of hydrogen gas can be supplied, the present invention also has an effect suitable for a large-capacity tank of a bus or a truck.

In addition, the hydrogen gas supply system that implements the hydrogen gas supply method according to the present invention has the size to fit on the same skid.

The size to fit on the same skid is, for example, the size that fits in a 20-ft container and, specifically the floor area of the internal dimension of a 20-ft container is given as an example; however, the size is not limited to this example.

The hydrogen station where the present invention is applied is not limited to the use on land and may also be applicable to the use on the sea or the installation type or the mobile type.

Figure 3:
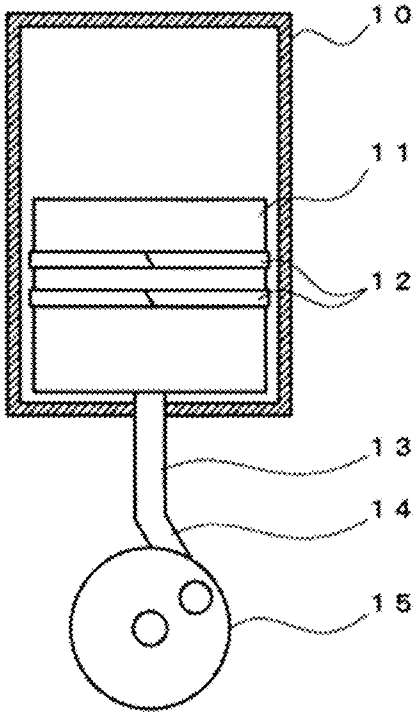
FIG. 3 is a schematic cross-sectional view illustrating one example of a piston crank type compressor.

FIG. 3 is a schematic cross-sectional view illustrating one example of the piston crank type compressor.

In FIG. 3, a piston 11 is provided inside a cylinder 10, and a piston ring 12 is provided to prevent leakage from an outer periphery of the piston 11 to some extent. A plurality of the piston rings 12 can be provided. In the example illustrated in the drawing, two piston rings are provided. A lower part of the piston 11 is supported by a piston rod 13. The piston rod 13 is connected to a crankshaft 15 through a connecting rod 14.

The crankshaft 15 is rotatably connected to a compressor electric motor (motor), which is not illustrated, and the motor's rotational driving causes the crankshaft 15 to rotate and the piston rod 13 whose motion is converted into linear reciprocation moves up and down.

As the crankshaft 15 rotates, the piston rod 13 moves up and down to cause the piston 11 to move up and down accordingly; thus, the hydrogen gas filling a space above the piston 11 is compressed.

Figure 4:
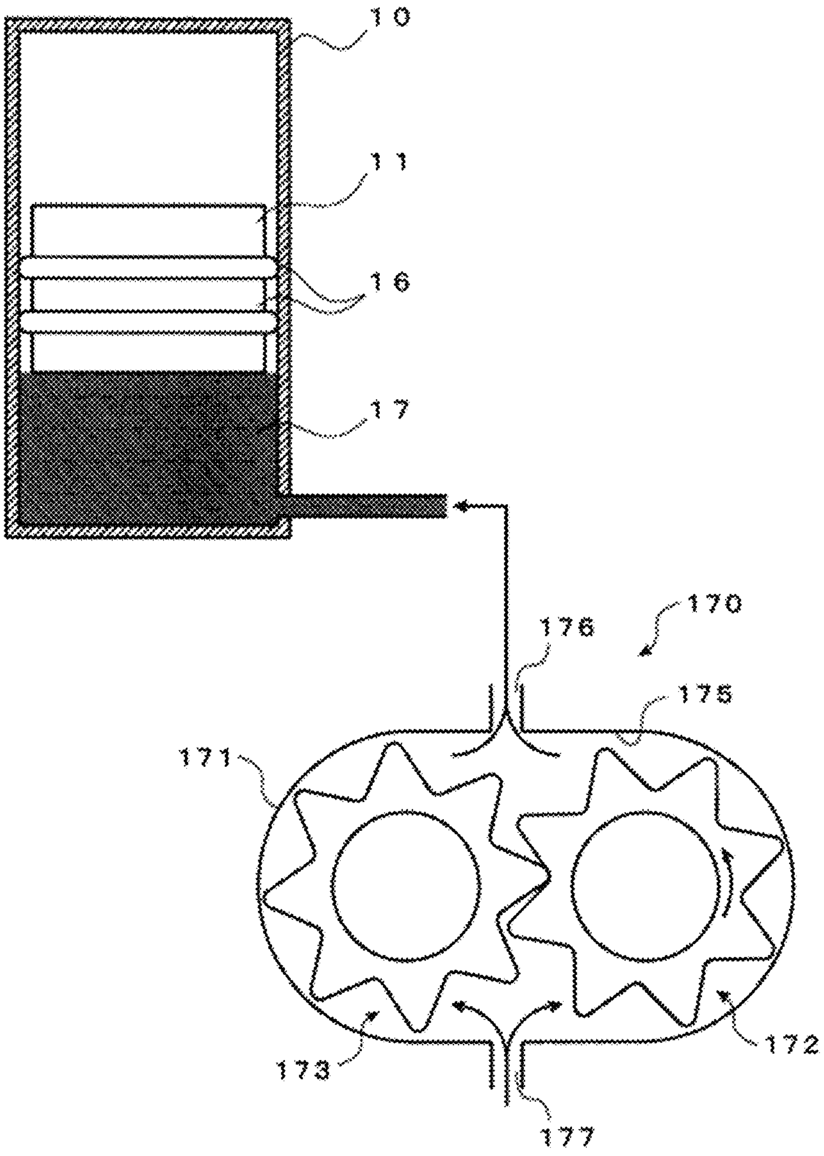
FIG. 4 is a schematic cross-sectional view illustrating one example of a hydraulic compressor.

FIG. 4 is a schematic cross-sectional view illustrating one example of the hydraulic compressor.

In FIG. 4, the pressure of a hydraulic fluid 17 is applied from below the piston 11 including a piston seal 16 provided in the cylinder 10.

The hydraulic fluid 17 is sent from a hydraulic pump 170, and the pump pressure of the hydraulic pump 170 pushes the piston 11 upward, thereby compressing the hydrogen gas filling the space above the piston 11 in the cylinder 10.

The hydraulic pump 170 has two gears 172 and 173 engaged with each other in a circumscribed state in which their outer surfaces are in contact with each other inside a casing 171. The gear 172 is a driving gear and the gear 173 is a driven gear.

When the engaged parts are separated by rotation, a space is generated to suck in the oil. The space is thus filled with the oil. The oil is guided along an inner surface 175 of the casing 171 toward a discharge side 176. The engaged part disconnects a suction side 177 and the discharge side 176.

The driving gear 172 is rotatably configured by a rotary shaft connected to an electric motor, which is not illustrated.

When the driving gear 172 of the gear pump 170 in the drawing rotates, the oil pushed out of the gear pump 172 presses a hydraulic fluid 17 illustrated in FIG. 4.

Pressure is applied to the hydraulic fluid 17 from below the piston 11 including the piston seal 16 provided in the cylinder 10. Thus, the hydraulic fluid 17 presses the piston 11 upward by the pump pressure of the gear pump 172, which is a hydraulic pump, thereby compressing the hydrogen gas filling the space above the piston 11 in the cylinder 10.

In the case of mechanical driving without the hydraulic fluid, there is no object to leak into the cylinder 10; in this case, there is no risk of leakage from the piston ring 12 illustrated in FIG. 3. As a result, the load is not large compared to that in the hydraulic method; therefore, the piston speed can be increased.

In contrast to this, in the case of hydraulic method, the piston seal 16 preferably has a high sealing property because it is necessary to prevent leakage of the hydraulic fluid 17 to the process side. As a result, the piston speed is preferably kept low in order to prevent wear and damage of the piston seal 16.

In the example illustrated in the drawing, the hydraulic fluid is pressurized using the gear pump, and the pressurized hydraulic fluid presses the piston upward to compress hydrogen gas. However, it is only necessary that the pressure can be applied by the motive power of the electric motor to the hydraulic fluid through the driving shaft and the present invention is not limited to the gear pump as illustrated in the drawing.

A booster type hydraulic compressor that do not use a hydraulic pump to directly pressurize the hydraulic fluid can also be used.

This booster type hydraulic compressor applies pressure of the hydraulic fluid pressurized by the pressure air from below the piston, for example, so as to reciprocate the piston, thereby compressing the hydrogen gas filling the space above the piston in the cylinder. In this case, the motive power of the electric motor can be transmitted through the driving shaft to compress the air for compressing the hydraulic fluid.

Figure 5:
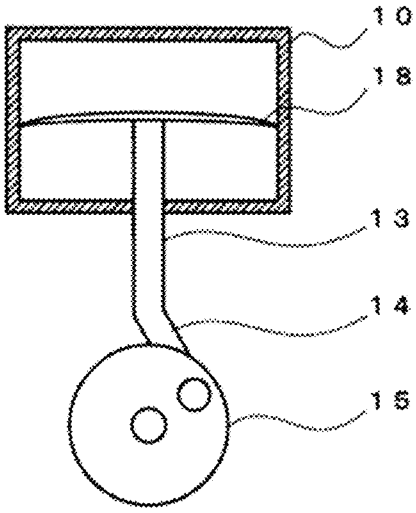
FIG. 5 is a schematic cross-sectional view illustrating one example of a diaphragm type compressor.

FIG. 5 is a schematic cross-sectional view illustrating one example of the diaphragm type compressor.

In FIG. 5, the piston rod 13 supporting a diaphragm 18 is reciprocated (moved up and down) to reciprocate (move up and down) the diaphragm 18, thereby compressing the hydrogen gas that fills the space above the diaphragm 18 in the cylinder 10.

This compressor is configured to compress by moving a metal film called a diaphragm up and down, causing a change in capacity. While having the advantages of having no sliding parts like a piston and no life due to wear, the diaphragm type compressor has a limited fatigue life because of the change in capacity due to elastic deformation of the diaphragm 18.

In the present invention, low-pressure compression and high-pressure compression are carried out by different types of compressors.

The hydraulic compressor includes a mechanism in which the piston is driven by the hydraulic force of the hydraulic oil. Due to limitations of the sealing of the hydraulic oil and the like, the maximum number of cycles is smaller than that of the piston crank type compressor having a crank mechanism. Therefore, the hydraulic compressor has a characteristic that the flow rate per compressor is lower in the pressure increase from low to high pressure as compared to the piston crank type.

However, the piston crank type can compress a large flow rate in compression from the low pressure because a large number of cycles is secured.

Ultrahigh-pressure compression at 80 MPa or more has been performed at hydrogen stations by the piston crank type compressors.

The piston crank type compressor is concerned about shortening of life and decrease in reliability of wear parts in dealing with the high pressure of 50 MPa or more, compared to the low-pressure compression at 50 MPa or less.

In contrast, the hydraulic compressor is superior in that this compressor does not have the above-described problems in the high-pressure region and the ultrahigh-pressure region.

Therefore, by taking advantages of the characteristics of both, the present invention provides the hydrogen gas supply method and system that are excellent in reliability and practicability at the high flow rate, in which the crank type compressor is disposed in the front stage and the hydraulic compressor or the diaphragm type compressor is disposed in the rear stage.

Next, based on FIG. 6 and FIG. 7, an aspect in which the electric motor is used in common between the low-pressure hydrogen compressor (piston crank type compressor) and the high-pressure hydrogen compressor (hydraulic compressor) will be described.

Using the electric motor in common means that only one electric motor is provided instead of providing the electric motor individually for each of the low-pressure hydrogen compressor and the high-pressure hydrogen compressor to drive both the low-pressure hydrogen compressor and the high-pressure hydrogen compressor, thereby performing the low-pressure and high-pressure hydrogen compressions.

Since the low-pressure hydrogen compressor is the piston crank type compressor and the high-pressure hydrogen compressor is the hydraulic compressor or the diaphragm type compressor, using the electric motor in common means that only one electric motor is provided instead of providing the electric motor individually for each of the piston crank type compressor and the hydraulic compressor to drive both the piston crank type compressor and the hydraulic compressor, thereby performing the low-pressure and high-pressure hydrogen compressions.

In addition, using the electric motor in common means that only one electric motor is provided instead of providing the electric motor individually for each of the piston crank type compressor and the diaphragm type compressor to drive both the piston crank type compressor and the diaphragm type compressor, thereby performing the low-pressure and high-pressure hydrogen compressions.

A specific structure in the case of using the electric motor in common will be described based on FIG. 6 and FIG. 7.

Figure 6:
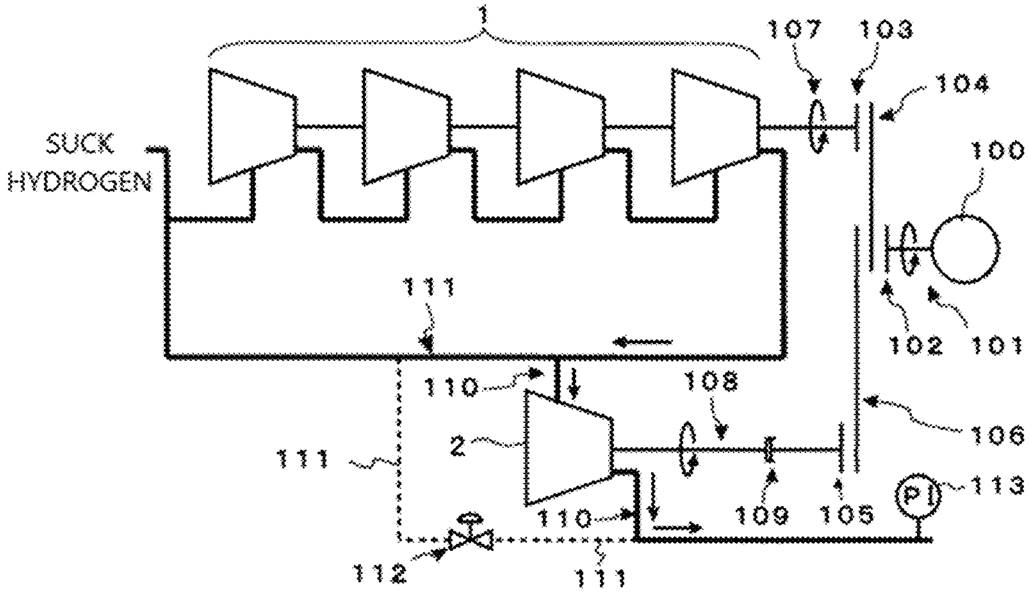
FIG. 6 is a diagram for describing an aspect of using an electric motor in common between a low-pressure hydrogen compressor and a high-pressure hydrogen compressor.
Figure 7:
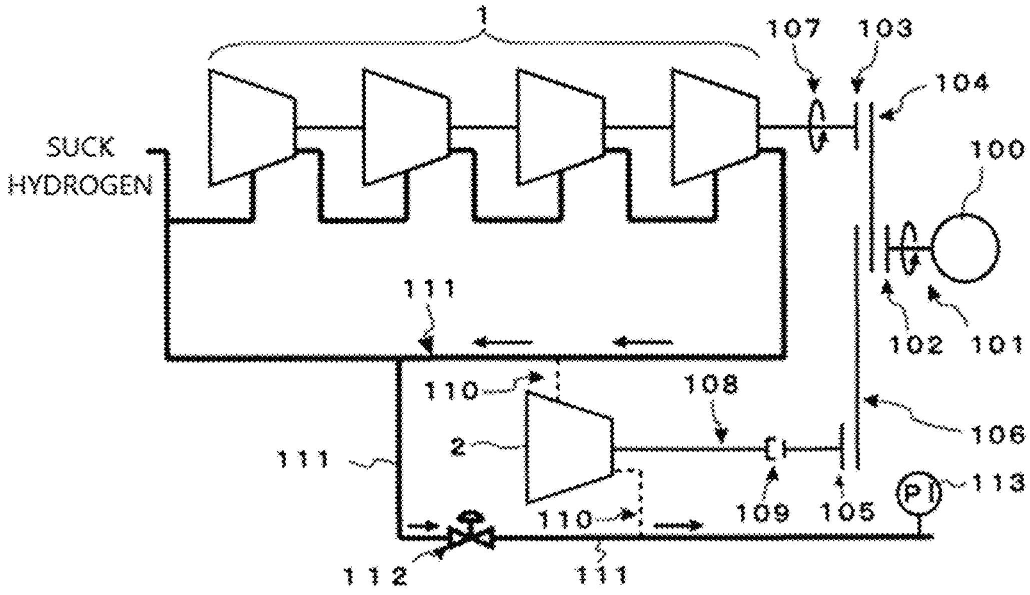
FIG. 7 is a diagram for describing an aspect of using the electric motor in common between the low-pressure hydrogen compressor and the high-pressure hydrogen compressor.

As illustrated in FIG. 6 and FIG. 7, a driving shaft 101 of an electric motor 100 includes an electric motor pulley 102, which can rotate as the driving shaft rotates.

The electric motor pulley 102 and a low-pressure hydrogen compressor pulley (piston crank type compressor pulley) 103 are connected to each other through a low-pressure hydrogen compressor belt (piston crank type compressor belt) 104, and a low-pressure hydrogen compressor side driving shaft (piston crank type compressor side driving shaft) 107 is connected to the low-pressure hydrogen compressor pulley 103.

The electric motor pulley 102 and a high-pressure hydrogen compressor pulley (hydraulic compressor pulley) 105 are connected to each other through a high-pressure hydrogen compressor belt (hydraulic compressor belt) 106, and a high-pressure hydrogen compressor side driving shaft (hydraulic compressor side driving shaft) 108 is connected to the high-pressure hydrogen compressor pulley 105.

The piston crank type compressor 1 is configured to be driven when the low-pressure hydrogen compressor side driving shaft 107 is rotationally driven.

The hydraulic compressor 2 is configured so that the gear 172 (see FIG. 4) connected to the high-pressure hydrogen compressor side driving shaft 108 is rotationally driven as the high-pressure hydrogen compressor side driving shaft 108 is rotationally driven, thereby pressurizing the hydraulic fluid.

In this embodiment, the diaphragm type compressor can be used instead of the hydraulic compressor as the high-pressure hydrogen compressor 2. In this case, the piston rod 13 (see FIG. 5) and the high-pressure hydrogen compressor side driving shaft 108 are connected to each other and by converting the rotational driving of the high-pressure hydrogen compressor side driving shaft 108 into the reciprocation of the piston rod, the diaphragm 18 (see FIG. 5) is driven.

In the example illustrated in the drawing, the low-pressure hydrogen compressor 1 performs four-stage compression; however, in this embodiment, although not illustrated in the drawing, a return pipe can be provided to adjust the hydrogen gas flow rate from each stage of the low-pressure hydrogen compressor 1. The high-pressure hydrogen compressor 2 may also include a return pipe to adjust the hydrogen gas flow rate.

The high-pressure hydrogen compressor side driving shaft 108 includes a clutch 109 that allows disconnection of the driving force of the electric motor 100. In other words, the clutch 109 allows ON-OFF control of the driving force of the electric motor 100.

The hydrogen gas is led to a piping system 110 on a suction side of the high-pressure hydrogen compressor 2 through the low-pressure compression of the low-pressure hydrogen compressor 1.

In this aspect, a branch piping system 111 is provided that bypasses the high-pressure hydrogen compressor 2 without entering the suction side of the high-pressure hydrogen compressor 2 through the low-pressure compression of the low-pressure hydrogen compressor 1, and leads to the discharge side of the high-pressure hydrogen compressor 2. The branch piping system 111 includes a control valve 112 whose opening and closing are controlled.

A pressure sensor 113 is provided near a hydrogen gas discharge part of the compressor to detect the discharging pressure.

FIG. 6 illustrates an aspect in which the clutch 109 is engaged. When the electric motor 100 is driven, the driving shaft 101 is rotationally driven. The rotational driving of the driving shaft 101 causes the low-pressure hydrogen compressor side driving shaft 107 to be rotationally driven, converts the rotational driving into the linear reciprocation of the piston through the crankshaft, and compresses the hydrogen gas filling the space above the piston in the cylinder.

At this time, the control valve 112 provided at the branch piping system 111 is closed; therefore, the hydrogen gas compressed in the low-pressure hydrogen compressor 1 is introduced into the piping system 110 leading to the high-pressure hydrogen compressor 2.

Since the clutch 109 is engaged in the high-pressure hydrogen compressor 2, the rotational driving of the driving shaft 101 of the electric motor 100 causes the high-pressure hydrogen compressor side driving shaft 108 to be rotationally driven, allowing the high-pressure hydrogen gas compressed by the high-pressure hydrogen compressor 2 to be discharged.

In FIG. 7, the clutch 109 is disengaged. When the electric motor 100 is driven, the driving shaft 101 is rotationally driven, and the rotational driving of the driving shaft 101 causes the low-pressure hydrogen compressor side driving shaft 107 to be rotationally driven. The rotational driving is then converted into the linear reciprocation of the piston through the crankshaft, and the hydrogen gas filling the space above the piston in the cylinder is compressed.

At this time, the control valve 112 provided at the branch piping system 111 is open; therefore, the hydrogen gas compressed by the low-pressure hydrogen compressor 1 bypasses the high-pressure hydrogen compressor 2 and is introduced into the branch piping system 111, without entering the piping system 110 leading to the high-pressure hydrogen compressor 2, and leads to the discharge side line of the high-pressure hydrogen compressor 2.

In this way, the low-pressure hydrogen gas compressed by the low-pressure hydrogen compressor 1 can be discharged without starting the high-pressure hydrogen compressor 2.

As described above, the electric motor 100 can be used in common between the low-pressure hydrogen compressor 1 and the high-pressure hydrogen compressor 2. Therefore, since the electric motor that used to be provided in each of the compressors can be omitted, the installation space can be reduced and moreover, the control becomes easy. Accordingly, the control panel can be reduced and the electric and control wires can be reduced.

In addition, the clutch 109 is provided at the high-pressure hydrogen compressor side driving shaft 108 connected to the common electric motor 100; therefore, when the high-pressure hydrogen compressor 2 does not need to be driven, the clutch 109 can be used to disconnect the electric motor 100, so that the high-pressure hydrogen compressor 2 can be kept from being driven.

Since the actual operating time of the high-pressure hydrogen compressor 2 is reduced accordingly, the maintenance period of the high-pressure hydrogen compressor 2 can be extended. As a result, the lifetime of the high-pressure hydrogen compressor 2 becomes longer and therefore, the lifetime of the entire compressors can be extended to the lifetime of the low-pressure hydrogen compressor 1.

In addition, auxiliary devices including a cooling fan that cools a coolant to cool the hydrogen gas used in the two types of compressors can be used in common, allowing for a significant reduction in installation space.

In the examples in FIG. 6 and FIG. 7, the low-pressure hydrogen compressor 1 performs four-stage compression and the high-pressure hydrogen compressor 2 performs one-stage compression; however, the present invention is not limited to this example.

Although not illustrated in the drawing, a mechanism is constructed so that the hydrogen gas compressed in each of these stages can exchange heat with the coolant for cooling, and in this case, the coolant is configured to be aggregated so as to be cooled by one cooling fan, which is not illustrated. This significantly reduces the installation space because one cooling fan is shared by two types of compressors, the low-pressure hydrogen compressor 1 and the high-pressure hydrogen compressor 2.

Thus, the installation space can be largely reduced, and therefore, a compressor unit that fits into a 20-ft container size can be formed.

Figure 8:
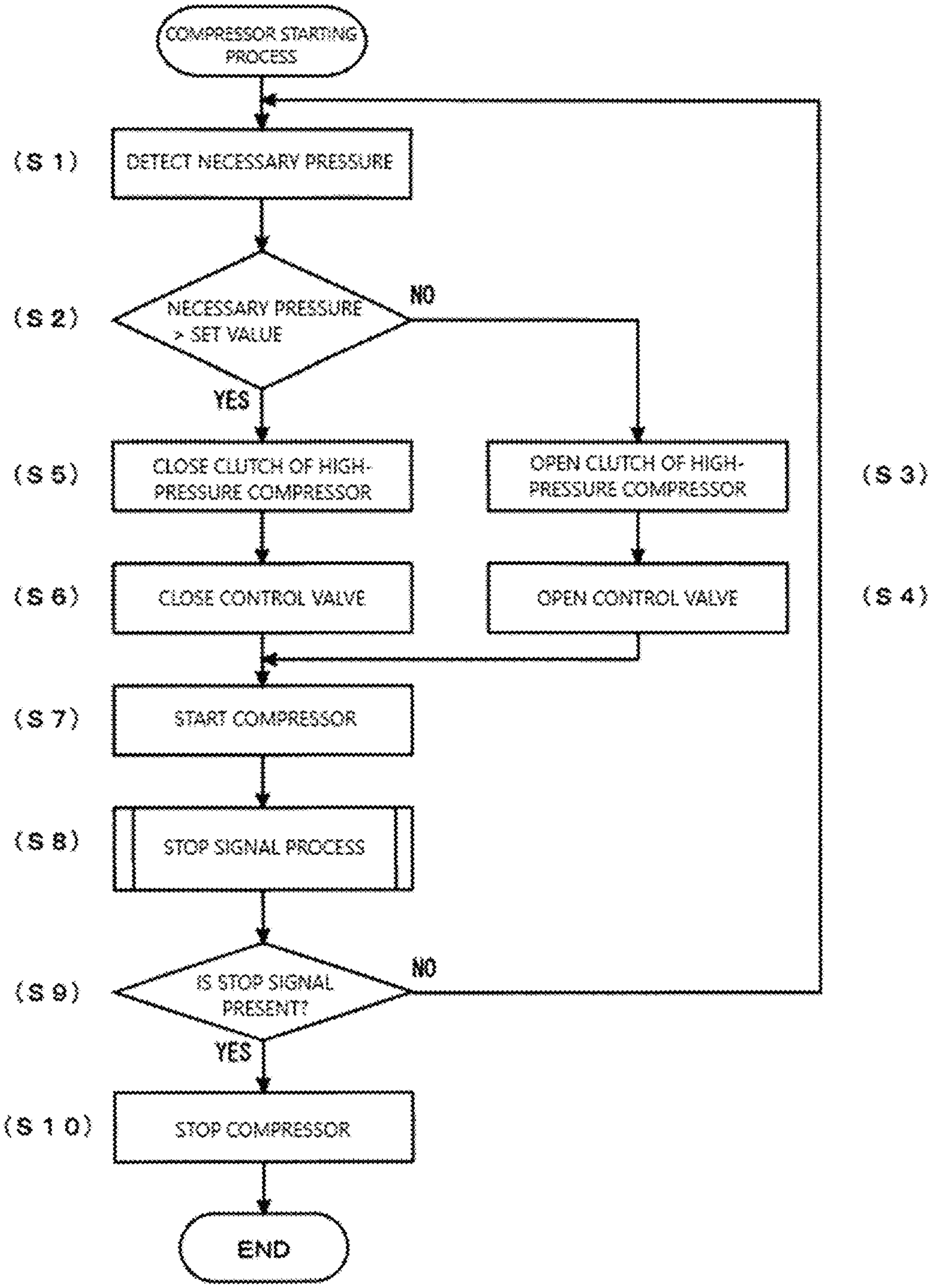
FIG. 8 illustrates one example of a control procedure of starting a compressor of a hydrogen gas supply system according to the present invention.

A control procedure of the system in this embodiment is described based on FIG. 8. Here, an example of the hydrogen supply by the direct filling method illustrated in FIG. 1 is described.

First, when the dispenser is connected to the hydrogen storage tank of the mobile body, the necessary pressure (required pressure) of the hydrogen storage tank is detected (S1).

Next, whether the necessary pressure is higher than a predetermined set value is determined (S2). Here, the predetermined set value is a preset pressure.

In this embodiment, for example, compression is performed in a total of five stages using the low-pressure hydrogen compressor with four stages and the high-pressure hydrogen compressor with one stage.

In this case, if the discharging pressure of the high pressure is 90 MPa and the sucking pressure thereof is 3 MPa, a 30-fold increase in pressure is required to raise the pressure from 3 MPa to 90 MPa. In the case of increasing the pressure 30 times in five stages, with the pressure increased equally in the respective stages, the pressure is increased 1.98 times per stage.

If the sucking pressure is 3 MPa and the pressure is increased equally by 1.98 times, the first stage discharging pressure is about 5.9 MPa, the second stage discharging pressure is about 11.6 MPa, the third stage discharging pressure is about 22.9 MPa, the fourth stage discharging pressure is about 45.2 MPa, and the fifth stage discharging pressure is about 90 MPa.

Thus, by designing the sucking pressure and the target discharging pressure, the ratio to increase the pressure in the respective stages can be determined by design.

Therefore, by setting the set pressure to a value equal to or near the discharging pressure in the final stage of the low-pressure hydrogen compressor 1 in the determined multiple stages, it is possible to determine whether to compress using the high-pressure hydrogen compressor 2 described below in relation to the necessary pressure of the supply destination of the compressor.

If the necessary pressure is not higher than the predetermined set value (NO at S2), the necessary pressure is lower than the set value (set pressure); therefore, the clutch 109 of the high-pressure hydrogen compressor 2 is disengaged (clutch is opened) (S3) and additionally, the control valve 112 is opened (S4) to start the electric motor 100 and the compressor (S7). In this case, only the low-pressure hydrogen compressor 1 starts and the high-pressure hydrogen compressor 2 does not start because the clutch 109 is disengaged.

On the other hand, if the necessary pressure is higher than the predetermined set value (YES at S2), the necessary pressure is higher than the set value (set pressure); therefore, the clutch 109 of the high-pressure hydrogen compressor 2 is engaged (clutch is closed) (S5) and the control valve 112 is closed (S6) to start the electric motor 100, thereby starting the compressor (S7). In this case, both the low-pressure hydrogen compressor 1 and the high-pressure hydrogen compressor 2 are started because the clutch 109 is engaged.

Next, when a predetermined condition for sending a stop signal is satisfied, a stop signal process to send the stop signal is performed (S8).

The predetermined condition for the stop signal process includes, for example, pressing of an emergency stop button, completion of hydrogen supply, or the like. Alternatively, machine failure or the like may be detected, and the condition may be determined preferably in consideration of safety and reliability.

Next, the presence or absence of a stop signal is determined (S9), and if the stop signal is present, the operation of the compressor is stopped (S10); if the stop signal is absent, the process returns to detection of the necessary pressure (S1) and the process continues until the stop signal is received.

The above embodiment is given as the example and it is not intended to limit the scope of the present invention. The embodiment can be implemented in various other modes, and various omissions, substitutions, and changes can be made to the extent that they do not depart from the gist of the invention. This embodiment and modifications thereof are included in the scope and gist of the invention as well as within the scope of the claims and their equivalents.

Explanations of Letters or Numerals

1 Low-pressure hydrogen compressor
2 High-pressure hydrogen compressor

3 Dispenser
4 Mobile body
5 Pressure accumulator
10 Cylinder
11 Piston
12 Piston ring
13 Piston rod
14 Connecting rod
15 Crankshaft
16 Piston seal
17 Hydraulic fluid
18 Diaphragm
100 Electric motor
101 Driving shaft
102 Electric motor pulley
103 Low-pressure hydrogen compressor pulley (piston crank type compressor pulley)
104 Low-pressure hydrogen compressor belt (piston crank type compressor belt)
105 High-pressure hydrogen compressor pulley (hydraulic compressor pulley)
106 High-pressure hydrogen compressor belt (hydraulic compressor belt)
107 Low-pressure hydrogen compressor side driving shaft (piston crank type compressor side driving shaft)
108 High-pressure hydrogen compressor side driving shaft (hydraulic compressor side driving shaft)
109 Clutch
110 Piping system
111 Branch piping system
112 Control valve
113 Pressure sensor

The invention claimed is:

1. A hydrogen gas supply method, comprising:
- using a low-pressure compressor and a high-pressure compressor that compress hydrogen gas, in which a necessary pressure at a supply destination includes a low-pressure region and a high-pressure region and the hydrogen gas is supplied to the supply destination in accordance with the necessary pressure;
- wherein the low-pressure compressor is a piston crank type compressor;
- wherein the high-pressure compressor is a hydraulic compressor or a diaphragm type compressor;
- wherein when the necessary pressure at the supply destination is in the low-pressure region, the hydrogen gas compressed by the low-pressure compressor is supplied to the supply destination; and
- wherein when the necessary pressure at the supply destination is in the high-pressure region, the hydrogen gas is compressed by the low-pressure compressor, the compressed hydrogen gas is introduced into the high-pressure compressor, and the hydrogen gas compressed by the high-pressure compressor is supplied to the supply destination.

2. The hydrogen gas supply method according to claim 1, wherein:
- the supply destination of the hydrogen gas is a pressure accumulator or a hydrogen storage tank of a mobile body, in a hydrogen station; and
- a filling method for the hydrogen storage tank is a direct filling method from the low-pressure compressor and the high-pressure compressor, a differential pressure filling method from the pressure accumulator, or a combination of the direct filling method and the differential pressure filling method.

3. The hydrogen gas supply method according to claim 1, wherein the low-pressure region of the necessary pressure at the supply destination is a region in which an upper limit value is an optional value of 40 to 50 MPa, and the high-pressure region is a region higher than the optional value as the upper limit value in the low-pressure region and is 100 MPa or less.

4. The hydrogen gas supply method according to claim 1, wherein the piston crank type compressor, and the hydraulic compressor or the diaphragm type compressor are mounted integrally and share common auxiliary devices to be configured as a unit having a size within a same skid.

5. The hydrogen gas supply method according to claim 1, wherein an electric motor is used in common between the piston crank type compressor, and the hydraulic compressor or the diaphragm type compressor.

6. The hydrogen gas supply method according to claim 5, wherein a clutch is provided to control ON and OFF of driving of the hydraulic compressor or the diaphragm type compressor.

7. A hydrogen gas supply system, comprising:
- a low-pressure compressor and a high-pressure compressor that compress hydrogen gas;
- wherein a necessary pressure at a supply destination includes a low-pressure region and a high-pressure region and the hydrogen gas is supplied to the supply destination in accordance with the necessary pressure;
- wherein the low-pressure compressor is a piston crank type compressor,
- wherein the high-pressure compressor is a hydraulic compressor or a diaphragm type compressor;
- wherein when the necessary pressure at the supply destination is in the low-pressure region, the hydrogen gas compressed by the low-pressure compressor is supplied to the supply destination; and
- wherein when the necessary pressure at the supply destination is in the high-pressure region, the hydrogen gas is compressed by the low-pressure compressor, the compressed hydrogen gas is introduced into the high-pressure compressor, and the hydrogen gas compressed by the high-pressure compressor is supplied to the supply destination.

8. The hydrogen gas supply system according to claim 7, wherein:
- the supply destination of the hydrogen gas is a pressure accumulator or a hydrogen storage tank of a mobile body, in a hydrogen station, and
- a filling method for the hydrogen storage tank is a direct filling method from the low-pressure compressor and the high-pressure compressor, a differential pressure filling method through the pressure accumulator, or a combination of the direct filling method and the differential pressure filling method.

9. The hydrogen gas supply system according to claim 7, wherein the low-pressure region of the necessary pressure at the supply destination is a region in which an upper limit value is an optional value of 40 to 50 MPa, and the high-pressure region is a region higher than the optional value as the upper limit value in the low-pressure region and is 100 MPa or less.

10. The hydrogen gas supply system according to claim 7, wherein the piston crank type compressor, and the hydraulic compressor or the diaphragm type compressor are mounted integrally and share common auxiliary devices to be configured as a compressor unit having a size within a same skid.

11. The hydrogen gas supply system according to claim 7, comprising:

an electric motor pulley provided at a driving shaft of an electric motor;

a piston crank type compressor pulley provided at a piston crank type compressor side driving shaft of the piston crank type compressor; and a hydraulic compressor pulley provided at a hydraulic compressor side driving shaft of the hydraulic compressor;

wherein the electric motor pulley and the piston crank type compressor pulley are rotatably connected to each other through a piston crank type compressor belt;

wherein the electric motor pulley and the hydraulic compressor pulley are rotatably connected to each other through a hydraulic compressor belt;

wherein the piston crank type compressor has a structure in which the driving shaft is rotated by driving of the electric motor and the rotation is converted into linear reciprocation of a piston through a crankshaft, thereby compressing the hydrogen gas that fills a space above the piston in a cylinder; and wherein the hydraulic compressor has a structure in which the driving shaft is rotated by the driving of the electric motor and a hydraulic pump is driven to generate a hydraulic pressure, the hydraulic pressure is converted into the reciprocation of the piston, and the reciprocation of the piston compresses the hydrogen gas that fills the cylinder.

12. The hydrogen gas supply system according to claim 7, wherein:

a piping system that leads to a suction side of the hydraulic compressor, which performs high-pressure hydrogen compression, through low-pressure compression of the piston crank type compressor, and leads to the hydraulic compressor, and a branch piping system that bypasses the hydraulic compressor without entering the suction side of the hydraulic compressor through the piston crank type compressor, and leads to a discharge side of the hydraulic compressor are provided;

a control valve that controls opening and closing is provided at the branch piping system;

a clutch that enables disconnection of a driving force of an electric motor of the hydraulic compressor is provided at a driving shaft of the hydraulic compressor;

when the necessary pressure at the supply destination is a set value or less, the clutch is disengaged to open the control valve; and when the necessary pressure at the supply destination is higher than the set value, the clutch is engaged to close the control valve.

13. The hydrogen gas supply system according to claim 7, wherein an electric motor is used in common between the piston crank type compressor, and the hydraulic compressor or the diaphragm type compressor.

14. The hydrogen gas supply system according to claim 13, wherein a clutch is provided to control ON and OFF of driving of the hydraulic compressor or the diaphragm type compressor.

* * * * *